(12) United States Patent
Simske et al.

(10) Patent No.: US 8,270,036 B2
(45) Date of Patent: Sep. 18, 2012

(54) VARIABLE DATA ADDITION METHOD AND SYSTEM

(75) Inventors: Steven J. Simske, Fort Collins, CO (US); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 12/359,067

(22) Filed: Jan. 23, 2009

(65) Prior Publication Data

US 2010/0188709 A1 Jul. 29, 2010

(51) Int. Cl.
*H04N 1/40* (2006.01)

(52) U.S. Cl. ....... 358/3.28; 382/100; 382/250; 382/254; 713/170; 713/176

(58) Field of Classification Search ................ 358/3.28, 358/3.02; 382/100, 289
See application file for complete search history.

(56) References Cited

U.S. PATENT DOCUMENTS

| 6,694,041 | B1 * | 2/2004 | Brunk | 382/100 |
|---|---|---|---|---|
| 6,763,121 | B1 * | 7/2004 | Shaked et al. | 382/100 |
| 6,870,640 | B1 * | 3/2005 | Fan et al. | 358/3.02 |
| 6,993,149 | B2 * | 1/2006 | Brunk et al. | 382/100 |
| 6,993,150 | B2 * | 1/2006 | Haynes | 382/100 |
| 7,466,234 | B2 | 12/2008 | Simske et al. | |
| 7,792,377 | B2 * | 9/2010 | Chen et al. | 382/250 |
| 2003/0179900 | A1 * | 9/2003 | Tian et al. | 382/100 |
| 2004/0158724 | A1 * | 8/2004 | Carr et al. | 713/186 |
| 2006/0202470 | A1 | 9/2006 | Simske et al. | |
| 2007/0024915 | A1 | 2/2007 | Simske et al. | |
| 2007/0256136 | A1 | 11/2007 | Simske et al. | |
| 2008/0043273 | A1 | 2/2008 | Simske et al. | |
| 2008/0149713 | A1 * | 6/2008 | Brundage | 235/435 |

* cited by examiner

*Primary Examiner* — Marivelisse Santiago Cordero
*Assistant Examiner* — Moustapha Diaby

(57) ABSTRACT

A variable data addition method and system are disclosed herein. The method includes generating an original image, and defining at least one sub-section of the original image to transform individually. A reversible transformation is applied to the defined at least one sub-section, thereby altering the original image to form an altered image that is non-readable until an inverse of the reversible transformation is applied to the altered image.

17 Claims, 2 Drawing Sheets

VARIABLE DATA ADDITION METHOD AND SYSTEM

BACKGROUND

The present disclosure relates generally to a variable data addition method and system.

Product labeling and security packaging are important components of brand protection, product tracking and authenticating, as well as of anti-counterfeiting initiatives. Such labels/packages must be authorized (i.e., access to them should be privileged), authenticable (e.g., containing encoded/encrypted information that can be decoded/decrypted for security purposes), and unique (i.e., differentiable from any other printed material). In an effort to create such labels/packages, a unique ID, in the form of, for example, a deterrent or mark may be added. Furthermore, measures are often taken to enhance the probability that the product cannot be counterfeited, for example, by making the packaging or labels difficult and/or time consuming to replicate and/or by using variable data printing (VDP).

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Figure 1:
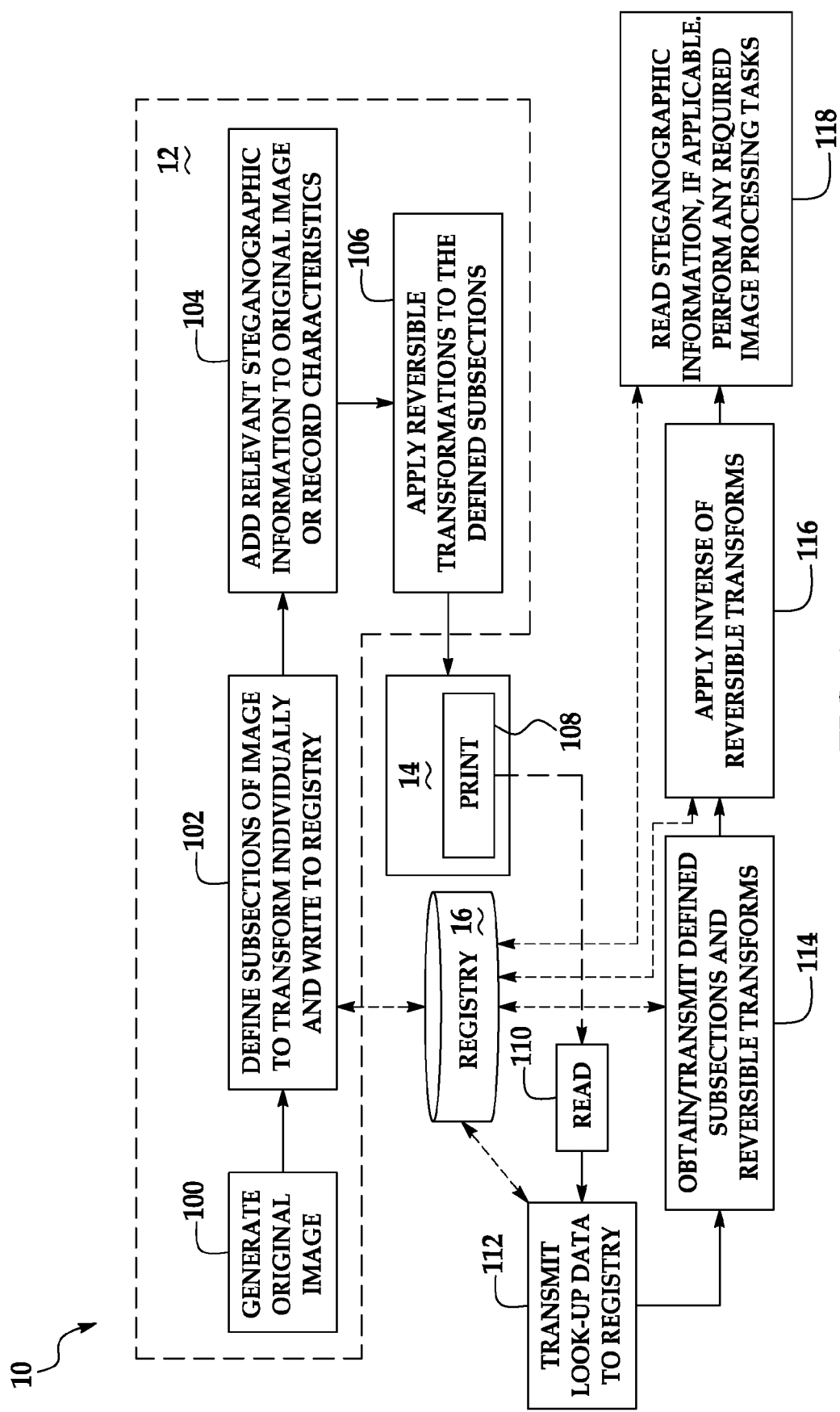
FIG. 1 is a schematic flow diagram depicting an embodiment of the variable data addition system and method disclosed herein.

Embodiments of the variable data addition system and method disclosed herein advantageously utilize the application of individual reverse transformations to one or more sub-sections of a printed image or an electronic image. Such reversible transformations assist in preventing reverse engineering of image security deterrents, which may include steganographic information (e.g., a digital watermark, explicitly added entropy/variability, etc.) hidden therein. For example, analysis of a subset of image security deterrents will not enable one to reliably predict other legitimate values without having to analyze such other values as well. In other words, a subset of a population will generally not provide insight into how the rest of the population has been created. As such, the reversible transformations provide an additional level of security for the image and the information contained therein.

As previously stated, one embodiment of the method involves applying one or more reverse (i.e., reversible) transformations to an image that is to be printed. Generally, such transformations are reversible after at least one print and scan cycle. In some instances, the reverse transformations applied to images that are to be printed are statistical in nature. The method and system involving images to be printed will be discussed further hereinbelow in reference to FIG. 1.

Also as previously stated, another embodiment of the method involves applying one or more reversible transformations to an electronic image. Such transformations may, in some instances, not be robust to copying. Furthermore, the reversible transformations applied to electronic images are often exact in nature. The method and system involving electronic images will be discussed further hereinbelow in reference to FIG. 2.

The method(s) disclosed herein are generally carried out utilizing a system including means for performing each of the steps. In one non-limiting example, the system includes a computer or enterprise computing system and programs or software configured to generate an original image and apply reversible transformations to sub-sections of the original image to form an altered version of the original image. The system also includes a party (e.g., consumer, manufacturer, inspector, etc.) who works with a secure registry (which is privy to information regarding the original images and any reverse transformations applied thereto) to determine whether deployed printed or electronic images are authentic.

As used herein, the term "enterprise computing system" means a network of interconnected computers, including virtualized and/or redundant processors, banks of processors and/or servers, etc. It is to be understood that the components of the system may be implemented in a consolidated location, or portion(s) of the system may be implemented at different locations. In some instances, all of the system elements are distributed or location virtualized. As one non-limiting example, the system includes a consolidated location for processing and storage (e.g., cloud computing), and different locations for each of image creation, printing, capture, image analysis, data analysis, etc.

The hardware of such a system includes an electronic processing device, such as, for example, a controller, a micro controller, a microprocessor, a host processor, an application specific integrated circuit (ASIC), and/or a reprogrammable hardware logic device such as a field programmable gate array (FPGA). It is to be understood that the electronic processing device may be a processor working in conjunction with a central processing unit (CPU) performing the function of a general-purpose processor.

Computer program(s) and/or software (e.g., computer readable code) may be loaded onto the computer or enterprise computing system, and stored in a memory thereof. Such programs and/or software are executable via the processing device. Examples of such programs(s) and/or software include those configured to generate original images and apply reversible transformations to such images. It is to be understood that the party and/or secure registry may also have access to computer program(s) and/or software in order to apply the inverse of the reversible transformations and/or to compare deployed (and, in some instance, transformed) images with those original and altered images stored in a database.

The system may also include one or more algorithms that are executable via the electronic processing device. Such algorithms are incorporated into the computer or enterprise computing system and/or into the software. Generally, images are generated, altered, and transformed by one or more of the algorithms.

Referring now to FIG. 1, components of an embodiment of the system 10 are schematically depicted. An embodiment of the method is also depicted in which the altered image is deployed as a printed image. As depicted in FIG. 1, an original image is generated (as shown at reference numeral 100). The original image may be generated using any suitable computer program(s) and/or software. The original image may include brand information, product information, manufacturer or distributor information, and/or any other desirable textual and/or graphical information. In some instances, the original image will also include one or more explicit security deterrent(s) that is/are capable of encoding information. Non-limiting examples of such security deterrents include color lines, fingerprints or other printed biometrics, location-indicative deterrents, Internet Protocol (IP) indicative marks (any web/Internet based identification strings, including IPv4 and IPv6 or other versions, security sequences, etc.), color text, copy detection patterns (CDP), color tiles, letter sequences, number sequences, graphic sequences, target patterns, bar codes, guilloche patterns, planchettes, holographs, anti-tamper deterrents, or other relevant deterrents known to those skilled in the art, or combinations thereof.

In some instances, when explicit security deterrents are utilized in the original image, at least this portion of the image is the same for every document, package, object, etc. upon which it is to be printed (or in which it is to be electronically included). Such security deterrents may be altered via the processes described hereinbelow, but that for a particular product, the security deterrent(s) in the original images is/are the same (even though the data hidden therein may be variable). In other instances, a variable set of deterrents may be reversibly transformed (in the same or a different manner) and deployed for a particular product. In these other instances, each product is associated with the registry and includes one feature that contains a unique identifier (or nonce). A non-limiting example of such a feature would be barcodes that are located at the same position on each product (or packing thereof). Each of the barcodes would have a different number, such that the number changes from product to product. This type of feature is static in that it is always a barcode and that it is always located in the same position relative to the physical dimensions of the product, but is unique in that it contains unique data.

The identifier/nonce can be used to query the secure registry/database, where the locations and transformations are stored for each of the variable features. In still other instances, hybridizations of the previous approaches are possible. As non-limiting examples, two reversibly transformed static deterrents that each contain a portion of a nonce that must be combined to obtain access to the registry may be deployed, or one static deterrent containing a nonce that leads to a variable deterrent with another nonce may be deployed. It is to be understood that in the embodiments disclosed herein, any variability is allowed so long as there is a reliable unique ID on each package/object that allows an authorized user to look up or gain access to the entire set of variable information (stored, for example, in a secure registry).

Once the original image is generated, one or more sub-sections of the original image are defined, and once defined, are written to and stored in a secure registry 16, as shown at reference numeral 102.

It is to be understood that it is desirable to select sub-sections that can be individually transformed. This may be desirable because each sub-section may then have a two-way function applied thereto, without affecting any other sub-section of the image. The sub-sections may be defined using, for example, an image segmentation system that is configured (i.e., with suitable computer program(s) and/or software) to divide the original image, reliably and repeatedly, into salient regions of interest. As a non-limiting example, if the original image is rectangular, the sub-sections may be tiles which when combined cover the entire original image. It is to be understood that any tessellation of an image is allowable, for example, paired right side up and upside down "L" shapes, brick wall (rectangles), digitized hexagonal patterning, any Escher-like tessellation, etc.

In the embodiment shown in FIG. 1, it is to be understood that any set of shapes covering any percentage of the original image are possible, so long as the write/read is robust enough to survive copying. Furthermore, the sub-sections may overlap or a plurality of sub-sections may be utilized. In either instance, the order in which the sub-sections are defined (and thus the order in which reversible transforms are applied) are stored in the secure registry 16 (or other secure database associated with or accessible by the computer or enterprise computing system).

If it is desirable, steganographic (i.e., covert) information may be added to the original image, as shown at reference numeral 104. Such information is often encoded into security deterrent(s) included in the original image. The steganographic information is variable, and thus may be different for each original image in a series (e.g., mass serialized). In some embodiments, the steganographic information is authenticating information, security information, or both. The information may be for tracking, branding, or the like, or various combinations thereof. In other embodiments, the information is decoy information meant to mislead an unintended recipient of that information. In still other embodiments, no information is hidden within the original image. It is also to be understood that a single image may have hidden therein any combination of the above, as desired; for example, an image may have hidden therein authenticating, security and tracking information, as well as some decoy information.

Further, it is to be understood that the information may be, for example, a code; a sequence of bits, bytes, characters, colors, graphics, numbers, etc.; a watermark; symbols; interpretable information; a fingerprint(s); other biometric data (e.g., encoded, encrypted, scrambled, chained to other information); a "payload;" modulation transfer functions (e.g., used in conjunction with a target pattern); other printed biometrics; location-indicative deterrents; Internet Protocol (IP) indicative marks (which, as previously mentioned, include any web/Internet based identification strings, including IPv4 and IPv6 or other versions, security sequences, etc.); or the like; or combinations thereof. A payload is usually a short (8-32 bit) message stored in the security deterrent. Examples of deterrents, information contained within such deterrents, or combinations thereof are described further in the following patent applications, each of which is incorporated herein by reference in its entirety: U.S. patent application Ser. No. 11/465,763 filed Aug. 18, 2006 (U.S. Patent Application Publication No. 2008/0043273, published Feb. 21, 2008); Ser. No. 11/414,113 filed Apr. 28, 2006 (U.S. Patent Application Publication No. 2007/0256136, published Nov. 1, 2007); Ser. No. 11/076,534 filed Mar. 8, 2005 (U.S. Patent Application Publication No. 2006/0202470, published Sep. 14, 2006); and Ser. No. 11/192,878 filed Jul. 29, 2005 (U.S. Patent Application Publication No. 2007/0024915, published Feb. 1, 2007).

As briefly referenced above, some deterrents may be decoy deterrents which appear to contain information (e.g., a barcode), when, in reality, it contains no information or misleading information. A decoy deterrent may also be capable of providing authenticating/security capabilities for some authenticating systems, but is not used in a particular authenticating system of interest. It may be desirable to make non-tracked and/or other decoy deterrents look as if reversible transformations had been applied to them. In some instances, such decoy deterrent will have reversible transformations added thereto, but such transformations will not be tracked (and thus are not used for authentication purposes). As such, in an embodiment, the primary (or sole) purpose of a decoy deterrent may be to evade a potential counterfeiter, to allow for the nature of the information to be altered without changing the in-place deterrents, or combinations thereof. Intentionally inactive instruments are further described in U.S. Pat. No. 7,466,234, issued Dec. 16, 2008, which is incorporated herein by reference in its entirety.

It is to be understood that any steganographic information that is added to the sub-section(s) may be recorded and stored in the secure registry 16.

In other instances, it may not be desirable to include any steganographic information in the original image. If no steganographic information is to be added (e.g., when sub-sections are used for image-based forensics), the characteristics of each sub-section (in terms of the image based forensic metrics) are recorded in the secure registry 16. In a non-limiting example, prior to transformations being applied, the original images (and thus the sub-sections) in a series may be as identical as possible; as such, the images are static and the transformations are variable. In such an example, the characteristics of each sub-section (and thus the image) may be recorded and later used to authenticate the image.

The characteristics may be image based forensic metrics which are relatively general, and thus can accommodate a wide variety of image types. Non-limiting examples of such characteristics include histogram information for at least one of cyan, magenta, yellow, red, green or blue; hue/saturation/intensity (HSI) histograms; frequency information; halftone patterning; halftone frequencies; palette; gamut; connected-component region size; connected-component region shape; distribution after analysis; printed dot density; printed dot color; printed dot orientation; printed dot shape; printed dot size; relative spacing of dots used in printing; absolute spacing of dots used in printing; and combinations thereof. When HSI histograms are utilized, the first through fourth moments (mean, standard deviation, skew and kurtosis) of the histograms are considered, along with histogram entropy and energy spectral density by band. Image fast Fourier transforms (FFTs) may also be performed to determine frequency information (including percentage of energy spectral density in various frequency bands, etc.).

Once steganographic information is added to the original image or the metric set is defined for the original image, reversible transformation(s) are applied to one or more of the defined sub-sections of the image, as shown at reference numeral 106. Such reversible transformations are two-way functions, each of which can be reversed when one is privy to a key (that represents the series of steps needed to apply the inverse transformation(s)) for inverting the particular reversible transformation. As such, the application of a reversible transformation to a sub-section generates an altered version of the original image and renders the original image non-readable. It is to be understood that one-way, or non-reversible, functions (e.g., median filtering) are generally not suitable for generating the altered image disclosed herein. This is due, at least in part, to the fact that such one-way functions result in lost data that cannot be recovered.

The term "non-readable" generally means that correct reading of the steganographic information or metric set is not possible unless the transformation is removed. In some instances, the information or metric set may be readable, but with significantly altered quality or quality grading (for example, if the altered image is an error code corrected image, more of the correction bits must be accessed before reading, or if the altered image is a copy-detection deterrent, the image quality metric may be greatly diminished until the transformation is reversed). As a non-limiting example, if a pair of frequencies is intentionally added, the original image is significantly degraded, but this degrading is readily removed with two notch filters.

When the altered image is to be printed and deployed, the reversible transformation is generally statistical in nature. Reversible statistical transformations add information to the image that prevents correct reading of the image. For example, if a watermark included in a sub-section of the original image is frequency-based (e.g., encoded in the frequency content of the image), then the reversible transformations may include adding explicit frequency information to the image, which can be later removed (filtered). In this example, the addition of frequency information to the original image frequencies having the smallest coefficients in the energy spectral density are generally reversible, and when removed, afford the steganographic information or metric set still readable. Other reversible statistical transformations include half-toning or hue transformation (i.e., transforming the color(s) in the original sub-section to different colors(s), which are not used in the original image). Non-limiting examples of reversible hue transformations include shifting one sub-section's colors 60° right on the color wheel and shifting another sub-section's colors 60° left on the color wheel; or transforming any smaller set of colors to any larger set of colors (e.g., mapping red to red and magenta, green to green and yellow, and blue to blue and cyan). Other examples of reversible statistical transformations include, but are not limited to, any pixel remappings, or adding pre-planned hue, saturation, or intensity shifts. Such transformations are suitable as long as the remapped space does not have ambiguous (multiple) mappings backwards (e.g., a larger set of colors to a smaller set of colors).

Any reversible transformations applied to the original image are written to the secure registry 16 such that the transformations are associated with the original and altered images in the registry 16.

As shown in FIG. 1, all of the steps 100, 102, 104, and 106 are performed, for example, at the previously described computer or enterprise computing system (shown as reference numeral 12).

The altered image may then be deployed. As shown at reference numeral 108 in FIG. 1, deployment includes printing the altered image on an object. The altered image may be sent to a printer 14 to be written on the object. It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

The printer 14 may or may not be privy to the reversible transformation(s) applied to original image. In some instances, the printer 14 is supplied the specifications for the altered image and no information about the reversible transformations utilized to obtain the altered image. As such, in these instances, the printer 14 is able to print the altered image, but is not able to correctly read the printed altered image.

Once objects including the altered images are deployed, a party (i.e., the previously mentioned consumer, brand owner, manufacturer, inspector, etc.) may encounter an object which includes an image similar to, or the same as the altered image. The party may wish to read (shown at reference numeral 110) and authenticate the image on the object. In such instances, the party will transmit a scan or other digital image of at least a portion of the printed image to the secure registry 16, as shown at reference numeral 112. The digital image of the portion(s) of the printed image is captured using an electronic device, such as, for example, a digital camera. It is to be understood that the digital camera may be embodied in, for example, a cellular phone, a personal digital assistant, or the like. Another suitable electronic device is a scanner, an inspection camera, a tabletop imager, or the like.

Upon initially making contact with the secure registry 16, in some instances, the party will be verified as a legitimate user who is able to access information stored in the registry 16. As a non-limiting example, the party may have to supply a login ID and password in order to receive information from the secure registry 16. Such verification may be desirable, especially in situations where the party will receive, from the secure registry 16, the key for undoing any reversible transformations applied to the original image. It is to be understood that other methods for verifying the party's identification may also be utilized.

The digital image transmitted to the registry 16 includes look-up data (see reference numeral 112). Such look-up data enables the secure registry 16 to associate the transmitted image with the defined sub-section(s) (and any reversible transformations applied thereto) of the authentic original and corresponding altered images. Such look-up data includes a barcode, a stock-keeping unit (SKU), a location, a lot number, or other information which identifies the object or assigns the object to a subset of overall possible products/items (e.g., 1 of 1 million products (roughly 20 bits) having 100 unique bits encoded therein means that the odds of guessing a legitimate bit string randomly is 1 in $2^{080}$). Such look-up data is associated with the object and altered image prior to deployment. If the image transmitted to the secure registry 16 does not contain look-up data, the secure registry 16 will request the party to transmit another digital image including such data.

Once the secure registry 16 obtains the look-up data, it associates such data with an altered image stored in its database(s), and any reversible transformations that have been applied to achieve the altered image, as shown in reference numeral 114. The identified reversible transformations may then be applied to the altered image(s) at the secure registry (reference numeral 116), or the identified reversible transformations may be transmitted to the party (or a third party) who applies the inverse transformations to the altered image(s) (reference numerals 114 and 116).

As mentioned, in one embodiment, the back-end service/registry applies the inverse transformations based on the key, and the inversely transformed image is then sent back to the party. This embodiment may be particularly suitable when the party's reading device or computing device (e.g., docking computer) is not responsible for or capable of performing the inverse transformations (i.e., such inverse transformations may take processing power not suitable to the party's device).

Also as mentioned, in another embodiment, the inverse transformations and key for applying such transformations are transmitted to the party, who then applies the inverse of the reversible transformations to the scanned version of the image printed on the object. In such instances, it is to be understood that the party has the equipment necessary for performing/applying the inverse transformations to the altered image. The inverse reversible transformations are the key to transforming the printed image and determining its authenticity. In this particular embodiment, after the printed image has been transformed using the inverse of the reversible transformations, it is then transmitted back to the secure registry 16.

The inversely transformed image may then be authenticated by the secure registry 16. If the transformed image corresponds with the original image (i.e., the altered image having the inverse of the reversible transformation applied thereto), any steganographic information within the transformed image (e.g., hidden in sections not reverse transformed, or readable only after reverse transformation with the remainder of the image being authenticated) may be extracted and read, and/or the characteristics of the metric set may be identified (reference numeral 118). Generally, if the original image (or a specific sub-section thereof) does not contain steganographic information, the metric set of the image (or specific sub-section) will be analyzed. In one embodiment, if steganographic information contained in and/or the metric set of the transformed image matches that in and/or of the original image, the transformed image is deemed to be authentic. In another embodiment, the steganographic information may be overt after the inverse of the reverse transformation is applied (e.g., a visible set of color sequences for a color tile that hides no other information may be revealed).

If the transformed image is authentic, further processing tasks may be performed (reference numeral 118). For example, a message (sent via text, phone, email, etc.) indicating that the image is authentic may be sent to the party. If, however, the information in and/or the metric set of the transformed image does not correspond with that in and/or of the original image, the transformed image is not authentic, and the object associated with such image may be counterfeit. It is to be understood that a variety of means (e.g., SMS messaging, email, phone, etc.) for communicating the non-authenticity of the image to the party may also be used.

Once the authenticity of the transformed image is determined, the secure registry 16 will inform the party as to whether the transformed image is authentic or not.

Figure 2:
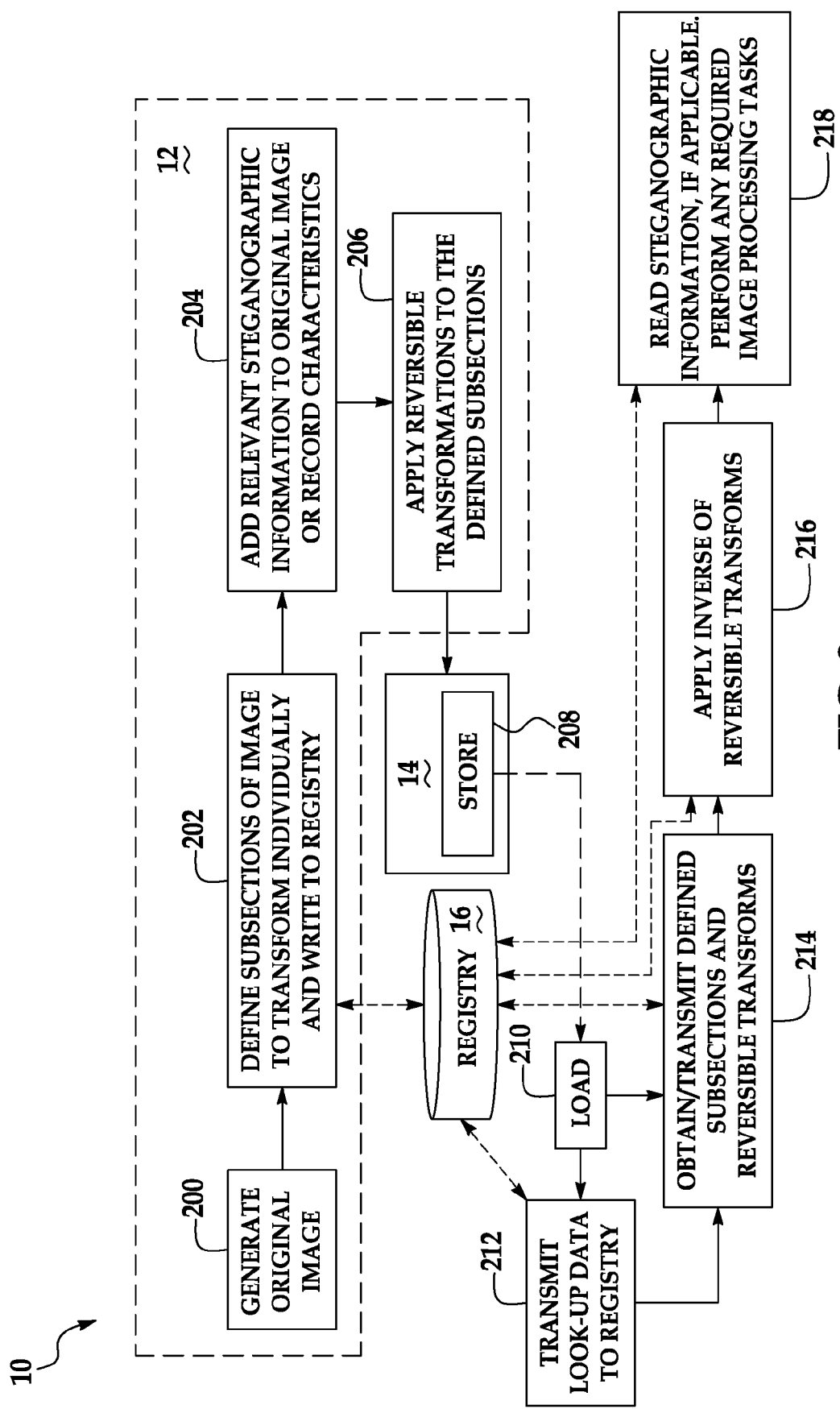
FIG. 2 is a schematic flow diagram depicting another embodiment of the variable data addition system and method disclosed herein.

Referring now to FIG. 2, components of another embodiment of the system 10' are schematically depicted. Another embodiment of the method is also depicted in which the altered image is deployed as an electronic image. Steps 200, 202 and 204 shown in FIG. 2 respectively include generating the original image, defining the sub-sections of the original image for individual transformation, and adding steganographic information or recording image characteristics, as described hereinabove.

When defining the sub-section(s) for an image that is to be electronically deployed, it is to be understood that the size and shape of the individual sub-sections will depend, in some instances and at least in part, upon the amount of information to be encoded. In such instances, it will be desirable to include a sufficient number of pixels such that the desirable information can be encoded. The sub-sections in this embodiment may be determined by printing test sheets with different sized sub-sections and verifying that they can be read individually (differently).

As shown in FIG. 2 at step 206, reversible transformations are applied to one or more of the defined sub-sections. In this embodiment, such reversible transformations are two-way functions, each of which can be reversed when one is privy to a key for inverting the particular reversible transformation. As previously mentioned, the application of a reversible transformation to a sub-section generates an altered version of the original image and renders the original image non-readable. It is to be understood that one-way, or non-reversible, functions (e.g., median filtering) are generally not suitable for generating the altered image disclosed herein.

When the altered image is to be electronically deployed, the reversible transformation is generally exact in nature. Such exact reversible transformations are generally simpler than the previously described statistical reversible transformations. Non-limiting examples of exact reversible transformations include, but are not limited to the explicit alteration of the least significant bits (LSBs) of the pixels that may be applied to the original image, reduction of saturation in one color channel (but not others) of the original image, addition of frequency information to frequencies of the original image having the smallest coefficients in energy spectral density, and combinations thereof.

As mentioned in reference to FIG. 1, any reversible transformations applied to the original image are written to the secure registry 16 such that the transformations are associated with the original and altered images in the registry 16.

As shown in FIG. 2, all of the steps 200, 202, 204, and 206 are performed, for example, at the previously described computer or enterprise computing system (shown as reference numeral 12).

The altered image may then be deployed. As shown at reference numeral 208 in FIG. 2, deployment includes storing the altered image in an electronic document, and transmitting the electronic document to one or more outside parties (e.g., consumers, inspectors, etc.). An electronic document is any information that is contained in an electronic format. A non-limiting example of an electronic document is an electronic newsletter that contains information about a product or item (e.g., a drug).

In this embodiment, once the electronic document is deployed, a party (i.e., the previously mentioned consumer, brand owner, manufacturer, inspector, etc.) may receive or otherwise encounter an electronic document which includes an image similar to or the same as the altered image. The party may wish to load (shown at reference numeral 210) and authenticate the image contained in the electronic document. In such instances, the party will transmit all or a portion of the loaded electronic document to the secure registry 16. In this embodiment, the actual loaded electronic document or a portion of the actual loaded electronic document is electronically transmitted to the secure registry 16. As a non-limiting example, a minor portion of the actual loaded electronic document that hashes the transformations made on other portions may be the desirable portion to transmit to the registry 16.

As mentioned hereinabove in reference to FIG. 1, upon initially making contact with the secure registry 16, the party in this embodiment may also be verified as a legitimate user who is able to access information stored in the registry 16. Such verification may be desirable when the party will receive, from the secure registry 16, the key for undoing any reversible transformations applied to the original image.

The loaded electronic document transmitted to the registry 16 includes look-up data (see reference numeral 212). Such look-up data is similar to that previously described, which enables the secure registry 16 to associate the transmitted image of the loaded electronic document with the defined sub-section(s) (and any reversible transformations applied thereto) of the authentic original and corresponding altered images.

Steps 214, 216, and 218 in FIG. 2 are similar to steps 114, 116, and 118 described hereinabove in reference to FIG. 1. To briefly reiterate, once the secure registry 16 obtains the look-up data, it associates such data with an altered image stored in its database(s), and any reversible transformations that have been applied to achieve the altered image. The inverse of the identified reversible transformations are then applied to the image of the loaded electronic document via the registry or the party (who has received such transformations from the registry). The inverse reversible transformations are the key to transforming the image in the loaded electronic document and determining its authenticity. After the image of the loaded electronic document has been transformed using the inverse of the reversible transformations, it is then authenticated by the secure registry 16 (as described hereinabove). Once the authenticity of the transformed image of the loaded electronic document is determined, the secure registry 16 will inform the party as to whether the transformed image is authentic or not.

While several embodiments have been described in detail, it will be apparent to those skilled in the art that the disclosed embodiments may be modified. Therefore, the foregoing description is to be considered exemplary rather than limiting.

What is claimed is:

1. A variable data addition method, comprising:
generating an original image;
defining at least two sub-sections of the original image to transform individually; and
applying a different reversible transformation to each of the defined at least two sub-sections, thereby altering the original image to form an altered image that is non-readable until an inverse of each of the different reversible transformations is applied to the respective transformed at least two sub-sections of the altered image;
wherein each of the steps is performed by a processor executing computer readable code embodied on a non-transitory, computer readable medium
wherein steganographic information is not added to the image, and wherein the method further comprises recording a metric set for each of the at least two sub-sections in a secure registry, each metric set including at least one characteristic of the respective at least two sub-sections, the at least one characteristic selected from histogram information for at least one of cyan, magenta, yellow, red, green or blue; hue/saturation/intensity histograms; frequency information; halftone patterning; halftone frequencies; palette; gamut; connected-component region size; connected-component region shape; distribution after analysis; printed dot density; printed dot color; printed dot orientation; printed dot shape; printed dot size; relative spacing of dots used in printing; absolute spacing of dots used in printing; and combinations thereof.

2. The variable data addition method as defined in claim 1, further comprising storing the defined at least two sub-sections and the different reversible transformations in the secure registry.

3. The variable data addition method as defined in claim 2 wherein storing includes:
recording, in the secure registry, an order in which the at least two sub-sections are defined; and
recording, in the secure registry, an order in which the different reversible transformations are applied.

4. The variable data addition method as defined in claim 2, further comprising:
i) printing the altered image, or ii) storing the altered image;
i) reading the printed altered image, or ii) loading the stored altered image;
obtaining secure access to the secure registry, thereby gaining access to the defined at least two sub-sections and the different reversible transformations; and
applying the inverse of each of the different reversible transformations on the altered image, thereby obtaining the original image.

5. The variable data addition method as defined in claim 2 wherein the at least two sub-sections are security deterrents, and the method further comprises:
  incorporating a portion of a nonce into a first of the security deterrents; and
  incorporating an other portion of the nonce into a second of the security deterrents;
  wherein the portion of the nonce and the other portion of the nonce are combined to obtain access to the secure registry.

6. The variable data addition method as defined in claim 2 wherein the at least two sub-sections are security deterrents, and the method further comprises incorporating a nonce into a first of the security deterrents, wherein the nonce leads to a second of the security deterrents having an other nonce incorporated therein.

7. The variable data addition method as defined in claim 1 wherein the image is configured to be distributed in a printed format, and wherein the method further comprises defining the at least two sub-sections such that write/read of the at least two sub-sections is sufficient to survive copying.

8. The variable data addition method as defined in claim 7 wherein each of the different reversible transformations is a reversible statistical transformation technique that adds information to the original image that prevents correct reading of information embedded in the original image unless inverted.

9. The variable data addition method as defined in claim 1 wherein the image is configured to be distributed in an electronic format, and wherein the method further comprises defining the at least two sub-sections such that a sufficient number of pixels are included to encode information.

10. The variable data addition method as defined in claim 9 wherein each of the different reversible transformations is selected from alteration of least significant bits of pixels in the original image, reduction of saturation in one color channel of the original image, addition of frequency information to frequencies of the original image having the smallest coefficients in energy spectral density, and combinations thereof.

11. A variable data addition method, comprising:
  generating an original image;
  defining at least two sub-sections of the original image to transform individually;
  applying a different reversible transformation to each of the defined at least two sub-sections, thereby altering the original image to form an altered image that is non-readable until an inverse of each of the different reversible transformations is applied to the respective transformed at least two sub-sections of the altered image;
  storing the defined at least two sub-sections and the different reversible transformations in a secure registry;
  i) printing the altered image, or ii) storing the altered image;
  i) reading the printed altered image, or ii) loading the stored altered image;
  obtaining secure access to the secure registry, thereby gaining access to the defined at least two sub-sections and the different reversible transformations;
  applying the inverse of each of the different reversible transformations on the altered image, thereby obtaining the original image;
  recognizing that no steganographic information is embedded in the original image; and
  analyzing the at least two sub-sections using respective metric sets for the at least two sub-sections stored in the secure registry;
  wherein each of the steps is performed by a processor executing computer readable code embodied on a non-transitory, computer readable medium.

12. A variable data addition method, comprising:
  generating an original image;
  defining at least two sub-sections of the original image to transform individually;
  applying a different reversible transformation to each of the defined at least two sub-sections, thereby altering the original image to form an altered image that is non-readable until an inverse of each of the different reversible transformations is applied to the respective transformed at least two sub-sections of the altered image;
  storing the defined at least two sub-sections and the different reversible transformations in a secure registry;
  transmitting, to the secure registry, at least one of i) a scan of at least a portion of a printed image or ii) an electronic version of at least a portion of a stored image, the transmitted image including look-up data;
  at the secure registry, associating the look-up data with the defined at least two sub-sections and the different reversible transformations;
  transmitting the different reversible transformations to a party who transmitted the look-up data;
  applying, via the party, the inverse of each of the different reversible transformations to the at least the portion of the printed image or the at least the portion of the stored image, thereby forming a transformed image;
  transmitting the transformed image back to the secure registry; and
  verifying whether the transformed image includes the defined at least two sub-sections and thus the original image;
  wherein each of the steps is performed by a processor executing computer readable code embodied on a non-transitory, computer readable medium.

13. The variable data addition method as defined in claim 12, further comprising:
  extracting any steganographic information contained in the original image; and
  reading the extracted steganographic information.

14. A variable data addition method, comprising:
  generating an original image;
  defining at least two sub-sections of the original image to transform individually;
  applying a different reversible transformation to each of the defined at least two sub-sections, thereby altering the original image to form an altered image that is non-readable until an inverse of each of the different reversible transformations is applied to the respective transformed at least two sub-sections of the altered image;
  storing the defined at least two sub-sections and the different reversible transformations in a secure registry;
  transmitting, to the secure registry, at least one of i) a scan of at least a portion of a printed image or ii) an electronic version of at least a portion of a stored image, the transmitted image including look-up data;
  at the secure registry, associating the look-up data with the defined at least two sub-sections and the different reversible transformations;
  at the secure registry, applying the inverse of each of the different reversible transformations to the at least the portion of the printed image or the at least the portion of the stored image, thereby forming a transformed image; and at the secure registry, verifying whether the transformed image includes the defined at least two sub-sections and thus the original image;

wherein each of the steps is performed by a processor executing computer readable code embodied on a non-transitory, computer readable medium.

15. The variable data addition method as defined in claim 14, further comprising adding steganographic information to the image.

16. A system for performing a variable data addition method, the system comprising:

a processor to execute computer readable code embodied on a non-transitory, computer readable medium;

the computer readable code, when executed, causes the processor to:
generate an original image;
define at least two sub-sections of the original image to transform individually; and
apply a different reversible transformation to each of the defined at least two sub-sections, thereby altering the original image to form an altered image that is non-readable until an inverse of each of the different reversible transformations is applied to the respective transformed at least two sub-sections of the altered image;

a secure registry configured to store the original image, the altered image, and the different reversible transformations;

at least one of i) an object including a printed image or ii) an electronic document including a stored image, wherein the printed image or the stored image includes look-up data;

a party configured to transmit a scan of at least a portion of the printed image to the secure registry or an electronic version of at least a portion of the stored image to the secure registry, and to work with the secure registry to determine whether the printed or stored image is the altered image, and thus the original image; and a processor, at the secure registry, to execute computer readable code for:
associating the look-up data with the defined at least two sub-sections and the different reversible transformations;
applying the inverse of each of the different reversible transformations to the at least the portion of the printed image or the at least the portion of the stored image, thereby generating a transformed image; and
verifying whether the transformed image includes the defined at least two sub-sections, and thus the original image.

17. A system for performing a variable data addition method, the system comprising:

a processor to execute computer readable code embodied on a non-transitory, computer readable medium;

the computer readable code, when executed, causes the processor to:
generate an original image;
define at least two sub-sections of the original image to transform individually; and
apply a different reversible transformation to each of the defined at least two sub-sections, thereby altering the original image to form an altered image that is non-readable until an inverse of each of the different reversible transformations is applied to the respective transformed at least two sub-sections of the altered image;

a secure registry configured to store the original image, the altered image, and the different reversible transformations;

at least one of i) an object including a printed image or ii) an electronic document including a stored image, wherein the printed image or the stored image includes look-up data;

a party configured to transmit a scan of at least a portion of the printed image to the secure registry or an electronic version of at least a portion of the stored image to the secure registry, and to work with the secure registry to determine whether the printed or stored image is the altered image, and thus the original image;

a processor, at the secure registry, to execute computer readable code for:
associating the look-up data with the defined at least two sub-sections and the different reversible transformations; and
transmitting the different reversible transformations to the party;

an other processor, accessible via the party, to execute computer readable code for:
applying the inverse of each of the different reversible transformations to the at least the portion of the printed image or the at least the portion of the stored image, thereby generating a transformed image; and
transmitting the transformed image back to the secure registry; and the processor at the secure registry to further execute computer readable code for verifying whether the transformed image includes the defined at least two sub-sections, and thus the original image.

* * * * *

UNITED STATES PATENT AND TRADEMARK OFFICE
CERTIFICATE OF CORRECTION

PATENT NO. : 8,270,036 B2  
APPLICATION NO. : 12/359067  
DATED : September 18, 2012  
INVENTOR(S) : Steven J. Simske et al.

It is certified that error appears in the above-identified patent and that said Letters Patent is hereby corrected as shown below:

In column 10, line 29, in Claim 1, after "medium" insert -- ; --.

Signed and Sealed this
Fifth Day of February, 2013

Teresa Stanek Rea
*Acting Director of the United States Patent and Trademark Office*